United States Patent
Wu

(10) Patent No.: US 6,332,214 B1
(45) Date of Patent: *Dec. 18, 2001

(54) ACCURATE INVALIDATION PROFILING FOR COST EFFECTIVE DATA SPECULATION

(75) Inventor: Youfeng Wu, Palo Alto, CA (US)

(73) Assignee: Intel Corporation, Santa Clara, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/075,147

(22) Filed: May 8, 1998

(51) Int. Cl.[7] ................................................. G06F 9/445
(52) U.S. Cl. ......................................... 717/5; 717/9
(58) Field of Search ............................ 395/705, 706, 395/709; 717/5, 6, 9

(56) References Cited

U.S. PATENT DOCUMENTS

| | | | |
|---|---|---|---|
| 5,119,495 | * 6/1992 | King | 717/9 |
| 5,170,465 | * 12/1992 | McKeeman et al. | 717/4 |
| 5,420,990 | * 5/1995 | McKeen et al. | 712/216 |
| 5,421,022 | * 5/1995 | McKeen et al. | 712/23 |
| 5,457,799 | * 10/1995 | Srivastava | 717/4 |
| 5,526,499 | * 6/1996 | Bernstein et al. | 712/216 |
| 5,537,620 | * 7/1996 | Breternitz, Jr. | 717/9 |
| 5,542,075 | * 7/1996 | Ebcioglu et al. | 717/9 |
| 5,634,023 | * 5/1997 | Adler et al. | 712/23 |
| 5,655,122 | * 8/1997 | Wu | 717/5 |
| 5,664,193 | * 9/1997 | Tirumalai | 717/9 |
| 5,694,577 | * 12/1997 | Kiyohara et al. | 711/167 |
| 5,933,643 | * 8/1999 | Holler | 717/9 |
| 6,158,049 | * 12/2000 | Goodwin et al. | 717/4 |

OTHER PUBLICATIONS

Wu et al.; "Parallel processor balance through loop spreading". ACM Digital Library[online], 1989 Conference on High Performance Networking and Computing, pp. 665–674, Nov. 1989.*

Wu, Y., "Ordering functions for improving memory reference locality in a shared memory multiprocessor system". ACM Digital Library[online], 25th Annual International Symposium on Microarchitecture, pp. 218–221, Dec. 1992.*

Wu et al.; "Static branch frequency and program profile analysis". ACM Digital Library[online], 27th Annual International symposium on Microarchitecture, pp. 1–11, Nov. 1994.*

Su et al.; "A Study of pointer aliasing for software pipelining using run–time disambiguation". ACM Digital Library[online], 27th Annual International Symposium on Microarchitecture, pp. 112–117, Nov. 1994.*

(List continued on next page.)

Primary Examiner—Kakali Chaki
Assistant Examiner—Kelvin Booker
(74) Attorney, Agent, or Firm—Alan K. Aldous

(57) ABSTRACT

In one implementation, the invention involves a computer implemented method used in compiling a program. The method includes selecting conflict regions of the program. The method further includes performing invalidation profiling of load instructions with respect to certain ones of the conflict regions to determine invalidation rates of the load instructions. The method may further include a feedback step in which the invalidation rates are used by a scheduler of the compiler to determine whether to move the load instructions to target locations.

35 Claims, 3 Drawing Sheets

OTHER PUBLICATIONS

Huang et al.; "Speculative Disambiguation: A compilation technique for dynamic memory disambiguation". IEEE Xplore[online], 21st Annual International Symposium on Computer Architecture, pp. 200–210, Apr. 1994.*

Sato, T.; "Speculative resolution of ambiguous memory aliasing", IEEE Explore[online], 1997 Innovative Architecture for Future Generation High–Performance Processors and Systems, pp. 17–26, Oct. 1997.*

Ball et al.; "Optimally Profiling and Tracing Programs". ACM Digital Library[online]. ACM Transactions on Programming Languages and Systems, vol. 16, No. 4, pp. 1319–1360, Jul. 1994.*

Ball et al.; "Efficient Path Profiling". IEEE/IEE Electronic Library[online], Proceedings of the 29th Annual IEEE/ACM International Symposium on Microarchitecture, 1996, Dec. 1996.*

T. Ball et al., "Efficient Path Profiling," IEEE/ACM Intl Symp. on MicroArchitecture, MICRO–29, Dec. 2–4, 1996, pp. 46–57.

D. Chase et al., "Analysis of Pointers and Structures," Proc. of ACM SIGPLAN' 90 Conference on Programming Language Design and Implementation, Jun. 1990. pp. 296–310.

D. Connors, "Memory Profiling for Directing Data Speculative Optimizations and Scheduling," M.S. Thesis, University of Illinois, Urbana, IL, 1997, pp. cover through v and pp. 1–68. Note in particular pp. 34–50.

M. Emami et al., "Context–Sensitive Interprocedural Points–to Analysis in the Presence of Function Pointers," In Proc. of the ACM SIGNPLAN '94 Conf. on Programming Language Design and Implementation, Jun. 1994, pp. 242–256.

D. Gallagher et al., "Dynamic Memory Disambiguation Using the Memory Conflict Buffer," ACM SIGPLAN Notices, Nov. 1994, v 29 n 11, pp. 183–193.

A. Huang et al., "Speculative Disambiguation: A Compilation Technique for Dynamic Memory Disambiguation," Proc. of 21st Annual Intl. Symp. on Computer, Computer Architecture News, Apr. 1994, v 22 n 2, pp. 200–210.

A Nicolau, "Run–time Disambiguation: Coping with Statically Unpredictable Dependencies," IEEE Transactions on Computers, May 1989 v 38 n 5, pp. 663–678.

S. Weiss, "Memory Conflict Resolution in Vector Supercomputers," The Journal of Supercomputing, Mar. 1992 v 6 n 1, pp. 71–85.

R. Wilson et al., "Efficient Context–Sensitive Pointer Analysis for C Programs," In Proc. of ACM SIGPLAN '95 Conf. on Programming Language Design and Implementation, Jun. 1995, pp. 1–12.

* cited by examiner

ACCURATE INVALIDATION PROFILING FOR COST EFFECTIVE DATA SPECULATION

BACKGROUND OF THE INVENTION

1. Technical Field of the Invention

The present invention relates to compilers and, more particularly, to compilers that perform invalidation profiling for data speculation.

2. Background Art

A compiler is a program that reads a source program written in a source language and translates it into a target program in a target language. For example, a compiler may translate a high level source program (such as C++) into compiled code that can be understood by a processor, such as a microprocessor.

Many compilers include three stages: (1) a "front end" in which the source program is translated into intermediate representations; (2) a "middle end" in which machine independent optimizations are made; and (3) a "back end" in which machine dependent optimizations are made and code is generated. Optimizations can significantly improve running time and/or space requirements of the target program. However, "optimized" code is not necessarily optimal under any mathematical measure.

There have been attempts to find invalidation rates by comparing the addresses of load-store pairs. This approach may be referred to as a "pair-wise" approach. The pair-wise approach collects conflict rate as the probability that a load (L) and a store (S) access the same memory location. The pair-wise conflict rate is denoted PCR (L,S). Although pair-wise conflict rate has other uses, such as disambiguation in dependence analysis, it has several serious problems for directing data speculation. A fundamental limitation with the pair-wise approach is that PCR (L, S) is not schedule-region sensitive.

Data speculation may be expensive because recovery can take many CPU cycles. A study of data speculation, Gallagher et al., "Dynamic Memory Disambiguation Using the Memory Conflict Buffer," ACM SIGPLAN Notices, Nov. 1, 1994, v29 n11, p. 183, considered only register pressure as the cost of data speculation. The recovery cost was ignored by treating the number of cycles in a recover as equaling the number of cycles in a regular load. For many situations, this is not a realistic assumption.

Accordingly, there is a need for a compiler that performs accurate invalidation profiling for data speculation.

SUMMARY OF THE INVENTION

In one implementation, the invention involves a computer implemented method used in compiling a program. The method includes selecting conflict regions of the program. The method further includes performing invalidation profiling of load instructions with respect to certain ones of the conflict regions to determine invalidation rates of the load instructions. The method may further include a feedback step in which the invalidation rates are used by a scheduler of the compiler to determine whether to move the load instructions to target locations.

BRIEF DESCRIPTION OF THE DRAWINGS

The invention will be understood more fully from the detailed description given below and from the accompanying drawings of embodiments of the invention which, however, should not be taken to limit the invention to the specific embodiments described, but are for explanation and understanding only.

DETAILED DESCRIPTION OF PREFERRED EMBODIMENTS

1. Overview

Figure 1:
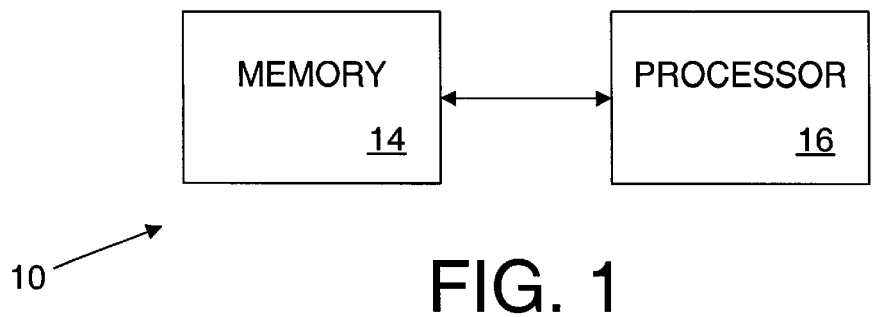
FIG. 1 is a block diagram representation of a computer system including memory and a processor that may be used to perform compilation.

Referring to FIG. 1, a computer system 10 includes memory 14 and a processor 16, which executes a compiler to compile a program in memory 14. Memory 14 holds the program to be compiled, intermediate forms of the program, and a resulting compiled program. Memory 14 is intended as a generalized representation of memory and may include a variety of forms of memory, such as a hard drive, CD-ROM, and random access memory (RAM) and related circuitry.

Reference in the specification to "one implementation" or "an implementation" means that a particular feature, structure, or characteristic described in connection with the implementation is included in at least one implementation (also called an embodiment) of the invention. The appearances of the phrase "in one implementation" in various places in the specification are not necessarily all referring to the same implementation.

Figure 2:
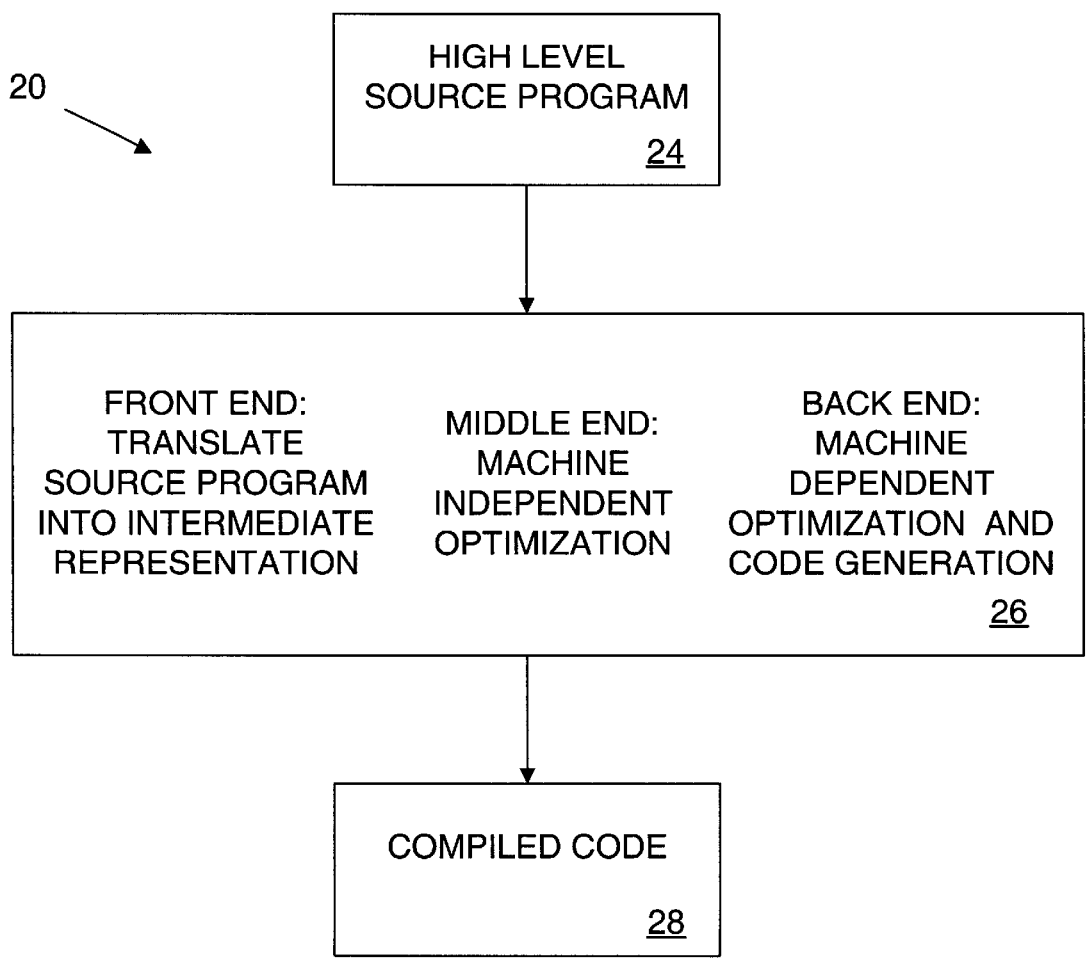
FIG. 2 is a flow diagram illustrating major features typically used in compilation from a high level source program to complied code.

There are various ways in which a program may be compiled. However, many compilation techniques can be characterized as in a flow chart 20 of FIG. 2. Referring to FIG. 2, a high level source program is represented in block 24. The source program may be held in memory 14 (shown in FIG. 1). As represented in block 26, in a "front end" of the compilation, the source program is translated into intermediate representations. In a "middle end" of the compilation, machine independent optimizations are made. In some situations, there may also be some machine dependent optimizations made in the middle end. In a "back end" of the compilation, machine dependent optimizations are made and code is generated. Compiled code is represented in block 28. The present invention is not restricted to a compiler that follows the outline of FIG. 2. In certain implementations, the invalidation profiling of the present invention may be performed in the back end of the compilation.

Figures 3, 4:
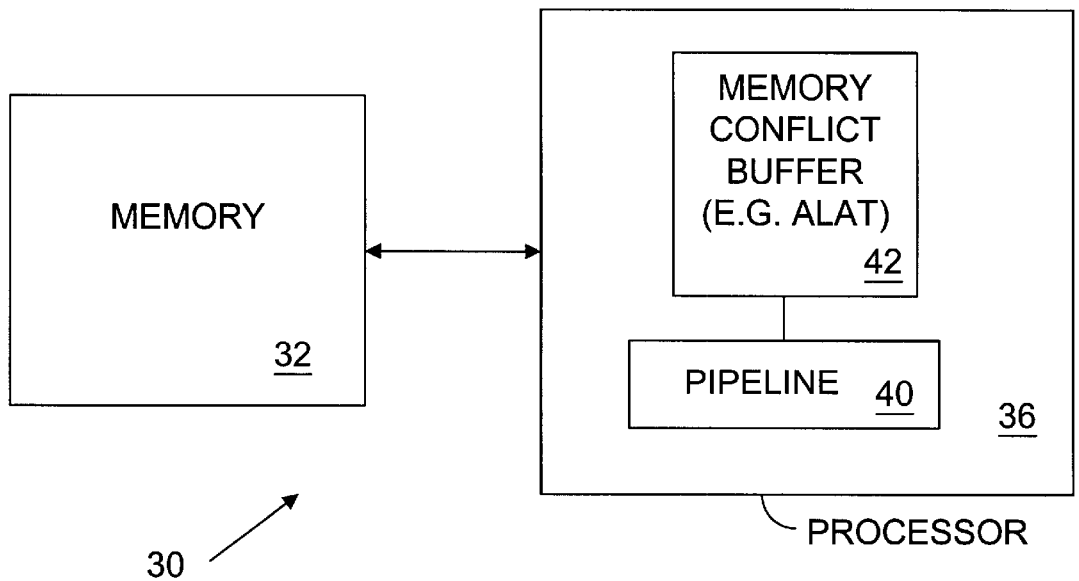
FIG. 3 is a block diagram representation of a computer system to execute the program compiled by the processor of FIG. 1.
FIG. 4 is a graphical illustration of a memory conflict buffer of FIG. 3.

FIG. 3 illustrates a computer system 30 including a memory 32 and a processor 36, which executes the program that is compiled in computer system 10. Memory 32 is intended to be a generalized representation of memory and may include, for example, a hard drive, CD-ROM, and RAM and related circuitry. Computer system 30 may perform data speculation, described below. As an example, computer system 30 includes a pipeline 40 and a memory conflict buffer (MCB) 42 of which an Advanced Load Address Table (ALAT) is an example. Of course, processor 36 would include various other elements. Computer systems 10 and 30 may be identical or different. (Depending on the implementation, computer system 10 could also execute the program it compiles, and computer system 30 could also compile the program it executes.) The present invention concerns compiling, not execution. However, the compiler may compile the programs such that they may be executed in computer systems that include some sort of memory conflict buffer and supports data speculation.

There may be substantial latency in loading from memory 32 to a register in processor 36. To avoid the latency, computer system 30 may perform speculative loads. However, the speculation is sometimes incorrect because a load is potentially dependent upon aliased stores that precede the load in a program. This makes it difficult to schedule the load before the stores. A compiler can aggressively utilize data speculation to, for example, significantly increase instruction-level parallelism in the compiled program. Aggressive speculation may generate many speculative and advanced (data speculative) loads with the same addresses.

As mentioned, the study of data speculation, Gallagher et al., "Dynamic Memory Disambiguation Using the Memory Conflict Buffer," ACM SIGPLAN Notices, Nov. 1, 1994, v29 n11, p. 183, considered only register pressure as the cost of data speculation. The recovery cost was ignored by treating the number of cycles of a recover as equaling the number of cycles of a regular load. If this assumption were correct, most loads could be beneficially data speculated. However, for many situations, a more realistic assumption for Rc/Lc may be 10 or more, where Rc is the number of cycle in a data speculation verify and recovery operation and Lc is the number of cycles in a regular load. In such a case, in one implementation, only loads with invalidation rate $\leq 10\%$ should be data speculated. Many loads are outside this range.

Compiler generated data speculation has been proposed as a runtime disambiguation mechanism, which allows for a compiler to move a load before a store even when the two operations may access the same memory location. When a load is speculatively executed before the potentially aliased stores, MCB 42 records the load address and other bookkeeping information. When a store operation is subsequently performed, the store address is compared with each valid address recorded in MCB 42. If the store address is the same as the address in an entry in MCB 42, the entry is invalidated. A DS_load is a data speculation load (sometimes called an advanced load). A DSV_recovery is a data speculation verify and recovery operation (sometimes called a check load). At the original location of the load, a DSV_recovery checks against possible invalidation. It examines MCB 42 to see if the entry for the speculatively executed load is still valid. If the entry is valid, the DSV_recovery becomes a no-op. Otherwise, DSV_recovery executes recovery code to reload the value. For ease of discussion, the recovery code is placed in curve brackets after the DSV_recovery instruction. One implementation may inline the recovery code at the site of the DSV_recovery instruction, or branch to a recovery block to do the recovery work and branch back, depending on the size of the recovery code. Example 1 shows an example of data speculation.

| store reg *p | reg1 = DS_load *q |
| reg1 = load* q; | store reg *p |
| | reg1 = DSV_recovery *q {reg1 = load *q} |

Example 1. Data Speculation: The speculatively executed load is "DS_load," and the speculation-verify operation is the "DSV_recovery."

When a DSV_recovery recovers a load, it may remove the invalidated entry from MCB 42. However, if the execution is likely to reach the DSV_recovery again without going through the DS_load, it is often beneficial to keep the invalidated entry in MCB 42 with the valid information. This can be achieved by using a DS_load to recover the load. This way subsequent execution of the DSV_recovery does not need to perform the reload if the DS_load executed in the recovery code is not invalidated. This is especially useful when the DS_load is outside a loop and the DSV_recovery is inside the loop. Example 2 shows a loop in which using a load in recovery code results in 10 reloads (b), while using a DS_load in recovery code needs only one reload (c).

| T: | T:r = DS_load a[1] | T:r = DS_load a[1] |
| For (i=1 to 10) | For (i=1 to 10) | For (i=1 to 10) |
| a[i] = . . . | a[i] = . . . | a[i] = . . . |
| L: r = load a[1] | L: r = DSV_recovery a[1] | L: r = DSV_recovery a[1] |
| . . . | {r = load a[1]} | {r = DS_load a[1]} |
| (a) | (b) | (c) |

Example 2. Recovering with DS_load inside loop reduces number of reloads from 10 (b) to 1 (c).

A more aggressive data speculation allows moving the operations using the result of a DS_load before stores. If the DS_load is invalidated, the recovery code redoes the load and all the operations that use the loaded value and have been speculatively executed. Example 3 shows an example of data speculation with use operations.

| store reg *p | reg1 = DS_load *q |
| reg1 = load *q; | reg2 = use reg1 |
| use reg1 | store reg *p |
| | reg1 = DSV_recovery *q {reg1 = load *q; reg2 = use reg1} |

Example 3. Data speculation of load and uses

Data speculation can also be used with control speculation to move a load above control branches as well as stores. For an implementation of the invention, it is assumed that DS_load can be moved safely passing conditionals.

In addition to stores that can invalidate a DS_load, operations that change the load addresses can also invalidate a DS_load. When the load address changes between a DS_load and its corresponding DSV_recovery, the recovery code may detect the address change and reload the value from the new address. In Example 3, the address of the second load is the result of the first load. Both loads can be moved out of the loop as long as the address change can be detected in the recovery code for the first load and the address can be regenerated for the second load. The second load is referred to as an "indirect load." Indirect loads happen frequently in programs with pointer-chasing operations. Speculating an indirect load uses the invalidation rate information for the load due to both address change and stores.

```
for (p = header; p; p=p->next)      reg1 = DS_load *q
store reg *p                         reg2 = DS_load *reg1
reg1 = load *q                       for (p = header; p; p=p->next)
x = load *reg1                         store reg *p
rest of the loop body                  reg1 = DSV_recovery *q
                                       {reg1 = DS_load *q;
                                       reg2 = DS_load *reg1}
                                       reg2 = DSV_recovery *reg1
                                       {reg2 = DS_load *reg1}
```

Example 4. Data Speculation of Indirect Load.

Referring to FIG. 4, an example of ALAT 50 includes at least three fields. A destination register number field holds an identification for the destination register in processor 36. A memory address field holds all or part of the memory address (e.g., physical or virtual). A valid field holds one or more bits that represents when a data speculative load has occurred that has not been invalidated, and when it is invalidated (e.g., by a store, ALAT conflict, or a semaphore). In a line of code, reg1=DS_load *q, a number representing reg1 is the destination register number and the contents of register q is the memory address. The details of the ALAT are implementation specific. In one implementation, the valid bit is initially set to 1 in response to the line of code reg1=DS_load *q, meaning that a store is not made to the same address and the data speculative load is valid (insofar as is then known). If the address of store reg *p is the same as in DS_load *q and the store is executed after the DS_load, the valid bit is changed to a 0, meaning the value accessed by the advanced load is invalid. With the valid bit equal to 0, the DSV_recovery reloads from *q. By contrast, if the address of store reg *p is different from that of DS_load *q, the valid bit would remain 1, and the DSV_recovery *q would not involve a reload.

In one implementation of the ALAT, only one entry is allocated for a destination register, regardless of how many loads are involved with that register. In another implementation, more than one destination register entry may be made for the same destination entry, provided a different address is involved. The ALAT may be fully associative, set associative, or direct mapped. In one implementation of the ALAT, the ALAT also includes an access size field (indicating the size of the region of memory being read) and a register type field (general or floating point). The type may be used with the destination register number as an index into the ALAT. The size, organization, matching algorithm and replacement algorithm of the ALAT are implementation specific. In one implementation, store and semaphore instructions search all entries in the ALAT using the address and size of the region of memory being written, and all entries corresponding to overlapping regions are invalidated (e.g., a 0 is placed in the valid field).

The invention is not restricted to any particular implementation of the ALAT. From the following examples, enough information is given for one skilled in the art to implement the invention to compile code for use by processors having ALATs or other memory conflict buffers. Of course, to some extent, details of the compiler depend on details of MCB 42.

In the following, any operation that may invalidate a load (whether it is a store, a call, or an operation that changes the load address) is referred to as a "load invalidation operation" (LIV operation).

Data speculation is very powerful at reducing the critical path length in a program. However, it may be effective only if the chance of runtime conflict is low; otherwise costly runtime compensation code can severely degrade performance. The primary cost may be that the recovery operations need to stall many cycles or even flush pipelines, which usually costs many times more cycles than the original load. Assume DSV_recovery takes Rc cycles when the DS_load is invalidated, and 0 cycles otherwise; the regular load costs Lc cycles; the operations in recovery code take Uc cycles (Uc=0 if no uses are speculated), and the invalidation rate is P. Also assume that the regular load and its uses are on a critical path, and the DS_load and its speculative uses can be executed in free slots. The cost saving by the data speculation is $$\text{Cost saving} = Lc + Uc - P * (Rc + Uc).$$

Positive cost saving (Cost saving >0) results only if $P < (Lc+Uc)/(Rc+Uc)$. For simplicity, it is assumed that Uc=0. P rapidly decreases from Rc/Lc=1 to about 2, and much less rapidly decreases from Rc/Lc=2 to about 10. For large Rc/Lc, the invalidation rate will be small. For example, when Rc is 5 times as expensive as Lc, positive cost saving is obtained only when P <20%. When Rc is 10 times more costly than Lc, the conflict ratio should be smaller than 10%.

The secondary costs include the unnecessary occupation of MCB 42 entries and the increased register pressure. In one implementation, if a DS_load is frequently invalidated, the data speculation should be avoided to save the precious MCB 42 space and avoid extending the lifetime of the target register of the load. Secondary costs are not considered in the following description.

The present invention involves a novel algorithm for profiling invalidation rates precisely and efficiently.

2. Region Based Invalidation Profiling and Related Work

Invalidation rates can be obtained either via static analysis or profiling. Static analysis can derive invalidation rates for array references with simple subscripts in simple loops. It involves estimating the size of the iteration space and the size of the invalidation space. For complex array subscripts, pointer references, or complex control flow inside a loop, deriving invalidation rates is a hard open problem.

Invalidation-profiling is the process of instrumenting memory references and running the instrumented program to obtain invalidation rates. The invalidation-profiling algorithm centers on the concept of "conflict region." For a load at location L that may be speculatively executed at a location T, the invalidation rate is the probability that the DS_load is invalidated between T and L. The code between T and L is referred to as the conflict region for the load and is denoted R(L, T). The invalidation rate for R(L, T) is denoted IR(L, T). For the code segment in Example 5, R(L, T) is the whole loop. IR(L, T)=20% as the DS_load is invalidated twice (in iterations 2 and 3) and there is no invalidation in the rest of the eight iterations (note that a[i] is a store instruction).

```
T:                          T: DS_load a[3]
  for (i=1 to 10)             for (i=1 to 10)
    a[i+1]=..                   a[i+1]=..
```

-continued

| | |
|---|---|
| a[i]=.. | a[i]=.. |
| L: load a[3] | L: DSV_recovery a[3] {DS_load a[3]} |

Example 5. Conflict region R(L, T) is the whole loop; Invalidation rate IR(L,T)=2/10.

The invalidation-profiling process can be intuitively described as follows (more formal description is given in the next section). The invalidation-profiler consults instruction scheduler to identify the candidate conflict regions R(Li, Ti), i=1, . . . , n, for data speculation. For each conflict region R(Li, Ti), instructions are inserted into the program to collect Ne, the number of times the load at Li is executed, and Nc, the number of times the (conceptual) DS_load at Ti is invalidated in the region. Then IR(Li, Ti)=Nc/Ne. During a feedback step, when the scheduler considers moving the load at Li to Ti, it uses the invalidation rate IR(Li, Ti) to decide the cost-benefit of the speculative code motion. This process gives accurate invalidation rate for data speculation when the workload for the actual run is similar to the profile run.

Problems of the pair-wise approach are overcome in the region based approach of the present invention.

2.1 Invalidation Rate Changes as the Conflict Region Changes

For a pair of load and store, their invalidation rate changes as the scheduling region changes. Thus a single invalidation rate for a pair of load and store is not useful for data speculation. Example 6 shows an example in which the load at location L may be moved to two locations T1 and T2. When the load is moved to T1, the invalidation rate is 20% because the load is executed 5 times and has one invalidation when i=7. However, if the load is moved from L to T2, the invalidation rate will be zero since there is no invalidation between DS_load at T2 and DSV_recovery at L (note that S2 and L are in mutually exclusive branches). This problem does not exist in the region-based approach, as the profiler gives IR(L, T1)=20%, and IR(L, T2)=0.

```
T1:
    for (i=0; i < 10; i++)
T2:
        S1:                    if (i is odd)
        S2:                        a[i]=..
        S3:                    else
        L:                         r = load a[7];
```

Example 6. Invalidation rate IR(L, T1)!=IR(L, T2).

2.2 Moving a Load Passing Multiple Stores

A pair-wise invalidation rate is not enough for moving a load passing multiple stores. For the code in Example 7(a), the pair-wise invalidation rate between the load at L and each of the stores is 20% (PCR(L, Ti1)=20%). Assume 20% is maximum allowed invalidation rate for data speculation. It may appear that the load can be moved to pass each of the stores to T5, as in Example 7(b). However, this intuition is incorrect. The DS_load at T5 is invalidated by one of the stores in every iteration. The invalidation rate is 100%.

| | |
|---|---|
| For (i=1 to 5) | For (i=1 to 5) |
| T5: | T5: DS_load a[5] |
|   a[i]=.. |   a[i]=.. |
| T4: | T4: DSV_recovery a[5] {DS_load a[5]} |
|   a[i+1]=.. |   a[i+1]=.. |
| T3: | T3: DSV_recovery a[5] {DS_load a[5]} |
|   a[i+2]=.. |   a[i+2]=.. |
| T2: | T2: DSV_recovery a[5] {DS_load a[5]} |
|   a[i+3]=.. |   a[i+3]=.. |
| T1: | T1: DSV_recovery a[5] {DS_load a[5]} |
|   a[i+4]=.. |   a[i+4]=.. |
| L: load a[5] | L: DSV_recovery a[5] {DS_load a[5]} |
| (a) | (b) |

Examples 7(a), (b). Pair-wise invalidation rate should not be used for pair-wise data speculation of DS_load The problem is that after moving L to T1 the load at T1 is a DS_load. When moving the DS_load at T1 to T2, the invalidation rate used in cost-benefit analysis should be max (IR(L, T2), IR(T1,T2)), since stores in both regions R(L,T2) and R(T1,T2) will invalidate the DS_load. Pair-wise approach does not have an invalidation rate for IR(L, T2) and thus cannot provide accurate invalidation rate to speculate the DS_load passing more than one store.

In certain cases, an invalidation rate can be derived from pair-wise rates. For example, if it is assumed that the stores are independent, then $IR(L,T5)=1-\Pi^5-PIR(L,Ti))=1-0.8^5=0.68$. However, stores are often not independent and the derived invalidation rates are often poor approximations. In Example 7, the derived invalidation rate of 68% is a very poor estimate for the actual invalidation rate of 100%.

The region-based approach considers the aggregated effect of all the LIV inside a region. The invalidation rate is accurate and directly usable by the data speculation. For the above example, the data speculation of moving the load at L to T5 is easily discarded as IR(L, T5)=100%.

2.3 Invalidation by Address Change

As mentioned earlier, a DS_load may be invalidated by an address change. Since many operations may change an address, pair-wise approach often ignores the invalidation in this situation the region-based approach handles this type of invalidation without difficulty.

2.4 Profiling Accuracy and Efficiency

Pair-wise approach typically compares a load with every stores executed before the load to determine conflict. If any of the previously executed stores is discarded, some of the conflict may lose and result in under estimate of the conflict rate. For large programs, the number of dynamically executed stores cannot be estimated at compile-time and there is a risk of running out of profile space at runtime. One of the early pair-wise profilers uses a fixed profile storage and have to give up accuracy when some of the stores have to be thrown away. This under estimates conflict rate and thus compromises it usefulness for memory disambiguation. The region-based profiler uses space linear to the sum of the numbers of stores and region loads in the source program (if a load is in R conflict regions, there are R region loads for the load).

Another problem with tracking all of the previously executed stores is the time taken by the profiler to run. It finds stores that potentially conflict with a load and the time taken to match the load with all of the conflicting stores can be overwhelming. The region based profiling is much more efficient since it compares each store with only the loads in the "active" regions. The active regions are all the regions that have been entered, but not exited yet. They contain the loads that may conflict with the store. The active regions are linked as an active list. For example, in Example 8, the stores in function foo( ) will not invalidate the loads in R(L, T) so the stores in is function foo( ) do not need to compare with loads in R(L, T).

```
main() {
    T:
    for (i=1 to 5) {
        a[i]=..
        L:    load a[5]
    }
    foo();
}
```

Example 8. The stores in foo( ) will not invalidate the load in R(L, T)

3. Conflict Region and Invalidation Rate

A conflict region is defined for a load location L and a target location T. (For simplicity, it may be assumed that conflict region has a single target location. The extension to multiple target locations is straightforward. For example, by changing "T dominates L" to "T collectively dominates L", the definitions for conflict region and invalidation rate apply to multiple target locations.)

For simplicity, it is assumed that the control flow graph has been modified such that the location T is at the beginning of a basic block and the load location L is at the end of block. (This is not necessary, as each location can be represented as a pair (block, instruction number inside the block).) Under this assumption, L or T is uniquely identified by their home blocks and L or T can be referred to as instruction locations or as the blocks they reside interchangeably.

Definition: Conflict Region. Assume the program control flow graph be G(N, E), where N is the set of basic blocks and E is the set of control flow edges. T dominates L. $G_T(N, E)$ is the sub-graph of G(N, E) with all incoming edges to T removed. Then the conflict region R(L, T) is defined as follows:

R(L, T)=(N', E'), where n∈ N' iff n is on a path from T to L in $G_T$(N, E) and (n, m)∈ E' iff n ∈ N'and m ∈ N' and (n, m) is an edge in $G_T$(N,E).

| for (j=0; j < 10; j++) | T2: |
| T1: | for (j=0; j < 10; j++) |
| S1: if (j is odd) | S1: if (j is odd) |
| S2: a[j]=.. | S2: a[j]=.. |
| S3: else | S3: else |
| L:    r = load a[5]; | L:    r = load a[5]; |
| Example 9(a) | Example 9(b) |

Examples 9(a), (b). Sample loops for conflict regions

For the loop in Example 9(a), the conflict region R(L, T1) consists of {S1, S3, L}. The store at S2 is not in the conflict region because the control never reaches L from T1 via S2 without going through the backedge (Notice that the backedge is not in $G_{T1}$(N, E)). For the loop in Example 9(b), the conflict region R(L, T2) is the whole loop {for statement, S1, S2, S3, L} including S2 as it can reach L via the backedge that is in $G_{T2}$(N,E).

The following follow from the above definition about conflict region R(L, T). Proposition 1. For a conflict region R(L, T), T dominates every node in R(L,T). Proposition 2. If an entry node of a reducible loop is in R(L, T), then every block in the loop is in R(L,T).

For instrumentation purposes, a conflict region consists of a list of member blocks, a pre-header block, an entry block, a list of exit blocks and one post-tail block for each exit block. A pre-header block may have only one immediate successor which is the region entry. Each post-tail has only one immediate predecessor that is a region exit.

A conflict region can be constructed in linear time (in terms of the number of edges in R(L, T)). L and T may be first placed in R(L,T). If L and T are at the same level, the immediate predecessor of L may be added to CR(L,T) and repeated until T is reached. If L and T are not at the same loop level, the loop at the same loop level as T that contains L may be found and the whole loop may be added to CR(L,T). Then visit the pre-header of the loop until T is reached. Once the list of members is found, the region information is then determined as follows.

The entry node is T.

The pre-header is the predecessor of T that is not a member.

The exit nodes are the members with at least one of its immediate successors being not a member.

The post-tails are the successors of exit nodes that are not members. The pseudo code in Example 10 finds the region information.

Invalidation rate IR(L, T) may be different when the recovery is done by a regular load or by a DS_load. Recovery by a DS_load may reduce the number of invalidation (although it may use more MCB entries). Accordingly, there are two definitions for invalidation rate: $IR_{DL}$(L, T) for recovery by a DS_load and $IR_L$(L, T) for recovery by a regular load. When the distinction between $IR_{DL}$ and $IR_L$ is not concerned, they may be both referred to as IR(L, T).

Definition: Invalidation Rate. Assume R(L, T) is entered n times at T. During the i'th entering of R(L, T), the load at L is executed $t_i$ times with load addresses $m_{i1}, m_{i2}, \ldots, m_{iti}$. Let $INV_{ij}=1, \ldots, t_i$, if an LIV operation in R(L, T) modifies the content of $m_{ij}$ or changes the value of $_{mij}$ between the load instances j−1 and j. Let $s_i$ be the smallest value such that $INV_{jsi}=1$. If $INV_{ij}=0$ for all j=1, $\ldots$, $t_i$,then $s_i=t_i +1$. Then, $$IR_{DL}(L, T) = \frac{\sum_{i=1}^{n} \sum_{j=1}^{t_i} INV_{ij}}{\sum_{i=1}^{n} t_i}$$

$$IR_L(L, T) = \frac{\sum_{i=1}^{n} (t_i - s_i + 1)}{\sum_{i=1}^{n} t_i}$$

Continue with Examples 9(a), (b). Assume the loop is entered n times and n >0. For both (a) and (b), L is executed 5 times in iterations 0, 2, 4, 6, and 8, so ti=5. For case (a), there is no LIV operation in the conflict region R(L, T1)= {S1, S3, L}. So $INV_{ij}=0$ and $s_i=t_i+1=6$. The invalidation rates $IR_{DL}$(L, T1)=0 and $IR_L$(L, T2)=n* (5−6+1)/(n*5)=0. For case (b), $INV_{i4}=1$ and $INV_{ij}=0$, for j=1, 2, 3, 5, as S2 updates a[5] between the load instances 3 and 4. So $s_i$=4. The invalidation rates $IR_{DL}$(L, T2)=n*1/(n*5)=⅕, $IR_L$(L, T2)= n*(5−4+1)/(n*5)=⅖.

The above definition is constructive and suggests the steps for profiling invalidation rates. The invalidation profiling will collect both $IR_{DL}$ and $IR_L$ (the overhead to collect both rates is similar to collecting only one rate). During scheduling, if $IR_{DL}$*cost (recovery with a DS_load) <$IR_L$*cost (recovery with a load), the scheduler may choose to use a DS_load over a regular load code recovery code.

```
// main routine                      // backward traversal to find members
find_CR(L, T) {                      find_members(n, T) {
    CR->pre_headers = 0                  if (n has been visited) return;
    CR->post_tails = 0                   add n to CR->members
    CR->entries = 0                      if (n == T) return;
    CR->exits = 0                        for each pred p of n
    CR->members = 0                         if p != T
    if (L and T are at the                     find_members(p, T)
    same loop level)
        find_members(L, T)           }
    else                             find_exit_post_tails(L, n) {
        find the loop at the             if (n has been visited) return;
        same loop level
        as T that contains L             for each succ s of n
        add all blocks in loop to           if s is in CR->members
        CR->members
        b = loop->pre-header                    find_exit_post_tails(L, s)
        find_members(b, T)               else
    find_exit_post_tails(L, T)              add s to CR->post_tails
    find_entry_pre_headers(L, T)        add n to CR->exits
    return CR                        }
}                                    //
                                     find_entry_pre_headers(L, T) {
                                         CR->entries = {T}
                                         for each pred p of T
                                             if p is not a member of T
                                                 add p to CR->pre_headers
                                     }
```

Example 10. Pseudo code for finding R(L, T)

The following results are useful to reduce invalidation-profiling overhead.

Proposition 3. Let R(L, T1) and R(L, T2) be two conflict regions for the same load at location L. If T1 and T2 are at the same loop level and the sets of LIV operations in the two regions are the same, then IR(L, T1)=IR(L, T2). Example 11 shows examples of two regions with the same invalidation rates.

```
for (i = 1, i ≤ n; i++)
T1:
                            c = b[i]
T2:
LIV:                        a[i] = k + b;
L:                          k = a[n];
```

Example 11. Example in which IR(L, T1)=IR(L, T2)

Proposition 4. Let R(L, T1) and R(L, T2) be two conflict regions for the same load at location L. If the sets of LIV operations in the two regions are the same and all the LIV operations dominate the load, then IR(L, T1) IR(L,T2). Example 12 shows an example of two regions with the same invalidation rates.

```
T1:
for (i = 1; i ≤ n; i++)
T2:
                            c = b[i]
LIV:                        a[i] = k + b;
L:                          k = a[n];
```

Example 12. Example in which IR(L, T1)=IR(L, T2)

The following result is helpful to combine conflict regions to reduce profiling overhead. Proposition 5. Let R(L, T) be a conflict region. If an exit block of R(L, T) and the corresponding post-tail block are at the same level and there is no LIV in the post-tail block, the post-tail block is added to R(L,T) to form R'(L,T). Then, the invalidation rate of L in R' (L,T) may be the same as L in R(L,T).

To simplify discussion, the concept of equivalent conflict regions may be defined as follows. Definition. Let CR(L1, T1) and CR(L2, T2) be two conflict regions for the same load at location L. If INVR(L1,T1)=INVR(L2,T2), then CR(L1, T1) and CR(L2, T2) are equivalent.

For a set of equivalent conflict regions, only one need be profiled. Reducing the number of conflict regions directly reduces the invalidation-profiling overhead. For example, this will reduce the number of conflict regions "active" at the same time. This can reduce the execution time of the instrumented code for stores.

Sometime the scheduler may be satisfied to use a less accurate invalidation rate. For example, when the execution frequency of a load is low, a conservative estimation of invalidation rate could be used, if doing can reduce the profiling overhead. The following proposition suggests to use IR(L, T1) as a conservative estimation of IR(L,T2).

Proposition 6. Let R(L, T1) and R(L, T2) be two conflict regions for the same load at location L. If T1 dominates T2 then IR(L, T1)$\geq$IR(L,T2).

4. Invalidation Profiling Algorithm

In one implementation, the invalidation-profiling algorithm precedes as follows.

4.1 Identifying Loads for Invalidation-profiling

The initial list of loads for invalidation-profiling includes all loads that are potentially aliased. Critical path analysis may be used to remove loads that are not on critical paths. A load selected for invalidation-profiling may be referred to as an "interesting load."

4.2 Modifying Control Flow Graph

In one implementation, it is required that each target location is at the beginning of a block. Since each target location precedes an LIV operation or a loop entry, blocks may be split before LIV operations and empty blocks may be inserted before loop entries (if there are an "interesting load" and an LIV in the loop).

4.3 Construct Conflict Regions

For each interesting load L, the set of target locations for the load may be identified. L's predecessor blocks may be visited repeatedly and target locations may be identified when a block B with the following conditions is encountered:

1. B contains an LIV operation, or
2. B is a loop entry.

In the first case, block B is a target location. In the second case, the pre-header of the loop is a target location. Assume the set of target locations $T_1, T_2, \ldots, T_k$ is found. Each of the target locations $T_i$ defines a conflict region R(L, T1), for i=1, ..., k. They are referred to as the "conflict region set" for L, denoted CR_set (L). It should be noticed that CR_set (L) may not contain all the possible conflict regions for the load. For example, if a target location T1 is preceded by blocks $T_{i1}, T_{i2}, \ldots T_{ik}$ without LIV operations, each of the location $T_{ij}$ defines a possible conflict region $R(L, T_{ij})$. However, by proposition 3, each conflict region $R(L, T_{ij})$ is equivalent to $R(L, T_i)$ and they have the same invalidation rate. The following result can be further shown.

Proposition 7. Any possible conflict region for a load L is either in CR_set (L), or is equivalent to a conflict region in CR_set (L).

4.4 Remove Unnecessary Conflict Regions

Unnecessary conflict regions are removed in the following steps:

Remove conflict regions in which the load is not aliased to any LIV in the region (according to static alias analysis information).

Remove conflict regions in which the load is not a constant address load or an indirect load.

Remove conflict regions in which the load is not on a critical path of the region.

Consult the scheduler to remove regions that are not likely used for data speculation.

4.5 Combine Conflict Regions

If two conflict regions $R(L_1,T)$ and $R(L_2,T)$ have the same set of member blocks then they are merged to a single conflict region. This will reduce the runtime overhead and space requirement. The resulting conflict region may keep track of the list of loads that reside in the combined region.

To increase the opportunity for combining conflict regions, each conflict region should be enlarged as described in proposition 5 until the conflict region cannot be extended. Two conflict regions that cannot be combined may be extended to the conflict regions with the same set of member blocks and can be combined.

4.6 Normalizing Conflict Regions

In one implementation, it is required that each region entry has a single pre-header and the pre-header has the entry as its sole successor. Also, each region exit has a single post-tail and the post-tail has the exit as its sole predecessor. If these conditions are not satisfied, empty blocks are inserted.

4.7 Instrumentation for Invalidation-profiling

Invalidation-profiler represents each conflict region by a data structure called Conf_Region. Each Conf_Region contains a list of RegionLoad data structures, one for each load in the conflict region. The formats for Conf_Region and Region_Load are listed in Example 13.

```
Conf_Region {                Region_Load {
    region_id;                   load_id;
    num_loads;                   num_exec;
    Region_Load *rl_area;        num_invalidation_DS_load;
    enter_count;                 num_invalidation_load;
    active_next;                 DS_load_addr;
    active_prev;                 DS_load_size;
}                                is_valid_DS_load;
                                 is_valid_load;
                             }
```

Example 13: Conf_Region and Region Load Data Structures

During profile run, a list of active Conf_Regions is maintained. Initially the list is empty. On entering a region R(L,T), its Conf_Region is added to the active list. Also the region loads in the Conf Region are initialized. Each store is instrumented to traverse the active Conf_Region list and check the store address against the address in each of the Region_Load in the active regions. If an address conflict is found, the is_valid flag for the load is reset. Each load is instrumented to examine its own region load structures. If the is_valid field in a Region_Load is reset, the number of invalidation field is incremented. On leaving a Conf_Region, the conflict region structure is removed from the active list. When the program terminates, the invalidation-profile results are output to a file.

The code instrumented into a user program is summarized as the functions listed in Example 14 (these functions should be inlined into user program for profiling speed).

```
// inserted into each prolog of        // inserted before each load
  conflict region r.
Enter_region(Conf_Region *r)           prof_load(Region_Load *r1 addr)
  if (r->enter_count > 0) {              if (!r1->is_valid_DS_load)
    r->enter_count++; /* r                 // invalidated by store
    is already active */
    return; }  /* via recursion */         r1->num_invalidation_DS_load++;
  add r to active                        else if (!r1->is_valid_load) {
  r->enter_count = 1                       // invalidated by store
                                           r1->num_invalidation_load++;
// inserted into a prolog of a           else if (addr != r1->DS_load_addr) {
  Conf_Region r
init_load(Region_Load                      // invalidated by addr change
  *r1, addr, size)
  duplicate the address                    r1->num_invalidation_DS_load++;
    generation for r1
  r1->DS_load_addr = addr;                 r1->num_invalidation_load++;
  r1->DS_load_size = size;                 r1->is_valid_load = 1;
  r1->is_valid_DS_load = 1;                r1->num_exec++;
  r1->is_valid_load = 1;                   r1->is_valid_DS_load = 1;
                                           // addr may change with store update
// inserted before each store              r1->DS_load_addr = addr
prof_store (store, addr, size)           // inserted before region exit
  for each conflict region rp            exit_region(Conf_Region *r)
  in active list
    for (i = 0;                            r->enter_count--;
    i ≤ rp->num_loads; i++)
    r1 = &rp->r1_area[i];                  if (r->enter_count == 0)
    if ([addr, size] overlaps with            remove r from active list
    [r1->DS_load_addr,                     // inserted at program exit
    r1->DS_load_size]
      r1->is_valid_DS_load = 0;  dump_dprof()
      r1->is_valid_load = 0;       for each module
                                   for each function
                                   for each conflict region
                                   for each load in the region
                                     output 1d id and $Ir_{d1}$ and $IR_1$
```

Example 14. Instrumentation code

Figure 5:
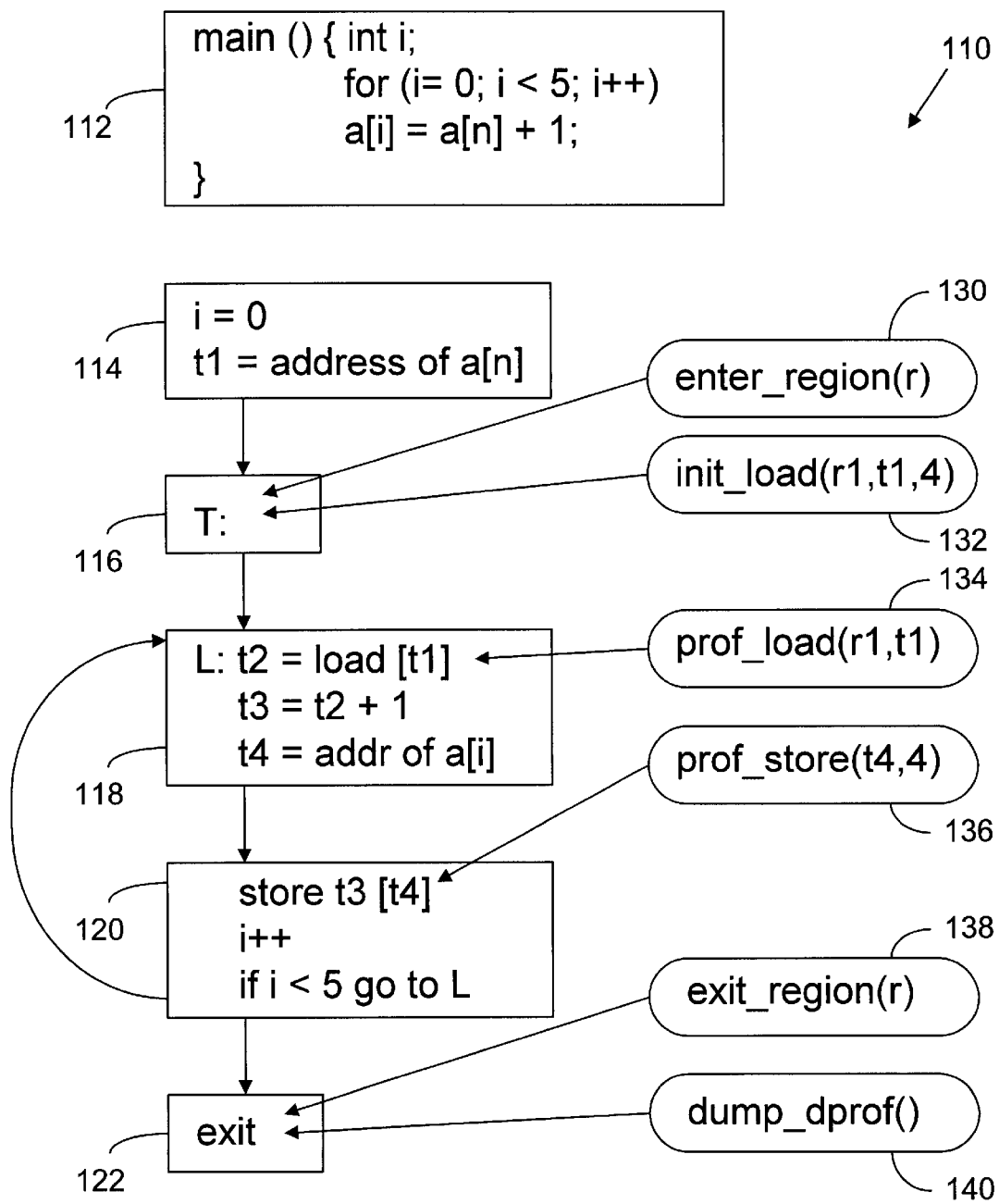
FIG. 5 is a flow graph illustrating an example of instrumentation.

FIG. 5 illustrates a flow diagram of an example of a program 110 including code in blocks 112, 114, 116, 118, 120, and 122. Profiling routines 130, 132, 134, 136, 138, and 140 are inserted into program 110 as illustrated. The program is executed with the profiling routines and the invalidation rates are noted. In FIG. 5, r is the address for the conflict region data structure and r1=& (r→r1_area[0]).

5. Use of Invalidation Profile

In one implementation, it is assumed that the invalidation-profile is collected in the same compilation phase as the instruction scheduler. The instruction scheduler sees the same control flow graph as the invalidation-profiler. Even though the invalidation-profiler modifies the control flow graph (e.g. splits blocks at LIV operations as described in Section 4.1, it takes only a little effort to map a scheduling region to a conflict region (our invalidation-profiler saves the mapping from the tuple "block identification (block id), instruction number within the block" to target location). When the scheduler wants to move a load at L to a location at T, it queries invalidation-profile database for IR(L,T). The query is answered in following order.

1. If the R(L,T) is profiled, return IR(L,T), else
2. If R(L,T) is equivalent to R(L,T1) which is profiled, return IR(L,T1).
3. If there is a R(L,T2) profiled and T2 dominates T, return IR(L,T2).
4. If any R(L,T3) is profiled, return IR(L,T3).
5. Return 0 for an optimistic scheduler or 1 for a pessimistic scheduler. The invalidation rate returned in step 1 or 2 is accurate. When no accurate invalidation rate is available, an approximate value is found depending on whether the scheduler is optimistic or conservative. The invalidation rate returned in step 3 may be conservative as IR(L,T2) $\leq$ R(L,T). Similarly, the invalidation rate returned in step 4 may be optimistic as R(L,T3) $\geq$ R(L,T). When there is no clue about IR(L,T) in the database, step 5 makes the worst case assumption.

6. Maintenance of Invalidation Profile

Even under the assumption that control graph is the same in the instruction scheduling phase as in the invalidation-profile phase, the scheduler may repeatedly schedule a load at L to a target location Ti such that IR(L, Ti), for i=1, . . . , n. In this case, there is an invalidation rate for the intermediate conflict region R(Ti-1,Ti). Similarly, the scheduler may move a store from one location to another location. Maintenance problems for invalidation-profile may include the following:

(1) For a load in a conflict region R(L,T), when it is moved from L to Ti determining the invalidation rate for R(Ti, T).
(2) For a store in a conflict region R(L,T), when it is moved to Ti determining the invalidation rate for R(L, Ti).

Maintenance problem (1) can be solved according to whether or not the load is data speculatively moved to Ti. If the load is not data-speculatively moved from L to Ti, there should be no data dependence violated. Every invalidation in R(L, T) will be in R(T1, T). So IR(Ti, T)=IR (L, T). If the load is data-speculatively moved from L to Ti, the load at Ti will be a DS_load. As discussed earlier, speculating a DS_load at Ti to T should use the following invalidation rate in cost-benefit analysis:

max (IR(L, T), IR(Ti, T))

Since IR(L, T) $\leq$ IR(Ti, T), IR(L, T) is used as the invalidation rate for R(Ti, T) when the load at Ti is DS_load. This result may be quite intuitive when noticing that when moving a DS_load, a DSV_recovery need not be added at Ti. The DSV_recovery will be performed at the original load location. So moving the DS_load at Ti to T has the same cost as moving the load at L to T. In both cases, the invalidation rate does not change when a load is moved.

Maintenance problem (2) can be solved by finding another conflict region that contains the new store location and load L.

When the control flow graph is changed during use of invalidation rates, the conflict region (s) in the old control graph should be mapped to the new control flow graph.

7. Implementation Issues

In one implementation, a recursive call may enter the same conflict region more than once and thus a region may appear in the active list more than once (only the latest region should be update by stores). This may involve dynamically create region data structure and also makes the total memory requirement unlimited at runtime. A region might be selected to be placed in the active list only once. A counter named "active count" is add to each region to keep track of how many times the region is entered. Each time the region is entered the counter is incremented and each time the region is exited the counter is decremented. Only when the counter reaches zero the region is removed from the active list. This significantly reduces runtime memory requirement and processing time at the cost of slight loss of accuracy.

Another issue is with library routines. In one implementation, the stores in the library routines should be instrumented so their conflicts with the loads are collected. Currently it is assumed that library functions are side-effect free. The effect of this assumption on overall accuracy of the invalidation rates may be further investigated.

The invalidation rates may be used in optimizations in addition to scheduling. Possible other uses include registerization and load-store removal operations.

Of course, a compiler according to the present invention may perform a variety of other functions in addition to those described herein and may be used in conjunction with other software.

If the specification states a particular event, activity, or feature "may", "can", "could", or "might" be included or have a characteristic, that particular event, activity, or feature is not required to be included or have the characteristic.

Code performing the functions or other activities of the invention may be stored on a machine readable medium such as memory 14 in FIG. 1. As merely examples, the code may be stored and transported on a disk, such as a CD-ROM, or be stored on a hard drive. The code can also be transmitted over conductors, such as through a modem.

While the invention is susceptible to various modifications and alternative forms, specific implementations thereof have been shown by way of example in detail herein. Those skilled in the art having the benefit of this disclosure will appreciate that many variations from the foregoing description and drawings may be made within the scope of the present invention. Accordingly, it is the following claims including any amendments thereto that define the scope of the invention.

What is claimed is:

1. A computer implemented method used in compiling a program, comprising:
    selecting conflict regions of the program; and
    performing invalidation profiling of load instructions at least some of which are data dependent load instructions with respect to at least some of the conflict regions to determine invalidation rates of at least some of the data dependent load instructions, wherein the invalidation profiling involves using a data speculative load instruction at a target location and a data speculation verify and recovery instruction at an original load instruction location.

2. The method of claim 1, further comprising a feedback step in which the invalidation rates are used by a scheduler of the compiler to determine whether to move the load instructions to target locations.

3. The method of claim 1, wherein the invalidation profiling includes an instrumentation phase in which profiling routines are inserted into the program.

4. The method of claim 3, wherein the invalidation rates are determined during the instrumentation phase and the invalidation rates are used by a scheduler in determining whether to have particular speculative loads in the compiled program.

5. The method of claim 1, wherein the invalidation rates for one of the load instructions is determined by forming different conflict regions containing different load invalidation operations.

6. The method of claim 1, wherein cost savings associated with the invalidation profiling are Lc+Uc −P*(Rc+Uc), where Lc is the number of cycles of a regular load, Uc is the number of cycles of recovery code that use the load result, P is the invalidation rate, and Rc is the number of cycles in a data speculation verify and recovery operation.

7. The method of claim 6, wherein when Rc is X times as expensive as Lc, positive cost saving is obtained only when P<1/X.

8. The method of claim 1, wherein the data speculative load instruction may be invalidated by an address change.

9. The method of claim 1, wherein instructions are inserted into the program to assist in determining Ne, the number of times the load instruction at the original load instruction location is executed, and Nc, the number of times a conceptual data speculative load instruction at the target location is invalidated in the conflict region, wherein the invalidation rate is Nc/Ne.

10. The method of claim 1, wherein the invalidation profiling avoids comparing a store with loads for which there could be no conflict.

11. The method of claim 1, wherein each load location and target location is specified by a block number and an instruction number in the block.

12. The method of claim 1, wherein the invalidation rates are used in optimizations in addition to scheduling.

13. The method of claim 1, wherein the invalidation profiling includes an instrumentation phase in which code is inserted into the program.

14. The method of claim 13, wherein for instrumentation purposes, a conflict region consists of a list of member blocks, a pre-header block, an entry block, a list of exit blocks and one post-tail block for each exit block.

15. The method of claim 1, wherein if two conflict regions have a same set of member blocks they are merged into a single conflict region.

16. The method of claim 1, wherein the invalidation profiling includes looking for equivalent invalidation conflict regions of one of the load instructions and profiling a subset of the equivalent conflict regions.

17. The method of claim 1, wherein the conflict region is a segment of the program including all code between a target location and a load instruction that would be encountered in going from the target to the load instruction without returning to the target.

18. The method of claim 1, wherein the invalidation profiling involve using a conservative approach that yields an invalidation rate that is equal to or higher than the actual rate but at a lower overhead.

19. The method of claim 1, wherein the invalidation profiling includes determining an invalidation rate $IR_{DL}$ for recovery by the data speculative load instruction and an invalidation rate $IR_L$ for recovery by a regular load.

20. The method of claim 19, wherein $$IR_{DL}(L, T) = \frac{\sum_{i=1}^{n} \sum_{j=1}^{t_i} INV_{ij}}{\sum_{i=1}^{n} t_i}$$

$$IR_L(L, T) = \frac{\sum_{i=1}^{n} (t_i - s_i + 1)}{\sum_{i=1}^{n} t_i}$$

where L is the load instruction, T is the target, i and j are indices, n is the number of times R(L,T) is entered, INV is an invalidation value, $t_i$ is the number of times L is executed, and $s_i$ is the smallest value such that $INV_{jsi}=1$.

21. The method of claim 1, wherein when a control flow graph is changed during use of invalidation rates, the conflict regions in an old control graph is mapped to a new control flow graph.

22. A computer implemented method used in compiling a program, comprising:
    determining invalidation rates for speculative load instructions in conflict regions; and
    using the invalidation rates during scheduling in determining whether to data speculate the loads, wherein if two conflict regions have a same set of member blocks they are merged into a single conflict region.

23. An article comprising: a machine readable medium having stored thereon instructions, which when executed by a processor, causes the processor to perform a method including:
    selecting conflict regions of the program; and
    performing invalidation profiling of load instructions at least some of which are data dependent load instructions with respect to at least some of the conflict regions to determine invalidation rates of at least some of the data dependent load instructions, wherein the invalidation profiling involves using a data speculative load instruction at a target location and a data speculation verify and recovery instruction at an original load instruction location.

24. The article of claim 23, further comprising a feedback step in which the invalidation rates are used by a scheduler of the compiler to determine whether to move the load instructions to target locations.

25. The article of claim 23, wherein the invalidation profiling includes an instrumentation phase in which profiling routines are inserted into the program.

26. The article of claim 23, wherein the invalidation rates are determined during the instrumentation phase and the invalidation rates are used by a scheduler in determining whether to have particular speculative loads in the compiled program.

27. The article of claim 23, wherein the invalidation rates for one of the load instructions is determined by forming different conflict regions containing different load invalidation operations.

28. The article of claim 23, wherein instructions are inserted into the program to assist in determining Ne, the number of times the load instruction at the original load instruction location is executed, and Nc, the number of times the conceptual data speculative load at the target location is invalidated in the conflict region, wherein the invalidation rate is Nc/Ne.

29. The article of claim 23, wherein the invalidation profiling includes looking for equivalent invalidation conflict regions of one of the load instructions and profiling a subset of the equivalent conflict regions.

30. An article comprising: a machine readable medium having stored thereon instructions, which when executed by a processor, causes the processor to perform a method including:

selecting conflict regions of the program; and performing invalidation profiling of load instructions with respect to at least some of the conflict regions to determine invalidation rates of the load instructions wherein the invalidation profiling includes an instrumentation phase in which profiling routines are inserted into the program.

31. An article comprising: a machine readable medium having stored thereon instructions, which when executed by a processor, causes the processor to perform a method including:

selecting conflict regions of the program; and performing invalidation profiling of load instructions with respect to at least some of the conflict regions to determine invalidation rates of the load instructions wherein invalidation rates are determined during the instrumentation phase and the invalidation rates are used by a scheduler in determining whether to have particular speculative loads in the compiled program.

32. An article comprising: a machine readable medium having stored thereon instructions, which when executed by a processor, causes the processor to perform a method including:

selecting conflict regions of the program; and performing invalidation profiling of load instructions with respect to at least some of the conflict regions to determine invalidation rates of the load instructions wherein the invalidation rates for one of the load instructions is determined by forming different conflict regions containing different load invalidation operations.

33. An article comprising: a machine readable medium having stored thereon instructions, which when executed by a processor, causes the processor to perform a method including:

selecting conflict regions of the program; and performing invalidation profiling of load instructions with respect to at least some of the conflict regions to determine invalidation rates of the load instructions wherein the invalidation profiling includes looking for equivalent invalidation conflict regions of one of the load instructions and profiling a subset of the equivalent conflict regions.

34. An article comprising: a machine readable medium having stored thereon instructions, which when executed by a processor, causes the processor to perform a method including:

determining invalidation rates for speculative load instructions in conflict regions; and using the invalidation rates during scheduling in determining whether to data speculate the loads, wherein the speculative load instructions include data speculative load instructions and at least one of the data speculative load instructions may be invalidated by an address change.

35. A computer implemented method used in compiling a program, comprising:

selecting conflict regions of the program; and performing invalidation profiling of load instructions at least some of which are data dependent load instructions with respect to at least some of the conflict regions to determine invalidation rates of at least some of the data dependent load instructions, wherein the invalidation rates for one of the load instructions is determined by forming different conflict regions containing different load invalidation operations.

* * * * *

UNITED STATES PATENT AND TRADEMARK OFFICE
CERTIFICATE OF CORRECTION

PATENT NO. : 6,332,214 B1
DATED : December 18, 2001
INVENTOR(S) : Wu

It is certified that error appears in the above-identified patent and that said Letters Patent is hereby corrected as shown below:

Column 3,
Line 35, delete "cycle", insert -- cycles --.

Column 7,
Line 62, delete "Ti1", insert -- Ti --.

Column 8,
Line 30, delete "$1 - \Pi - PIR(L,Ti))^5$", insert -- $1 - \Pi(1 - PIR(L,Ti))$ --.

Column 9,
Line 6, before "function", delete "is".

Column 13,
Line 6, delete "T1", insert -- Ti --.

Column 15,
Line 20, after "IR(L,T2)" delete "$\leq$", insert -- $\geq$ --.
Line 21, after "IR(L,T3)", delete "$\geq$", insert -- $\leq$ --.
Line 43, after "will be in", delete "R(T1, T)", insert -- R(Ti,T) --.
Line 50, after "IR[L,T), delete "$\leq$", insert -- $\geq$ --.

Signed and Sealed this

Twenty-second Day of October, 2002

Attest:

Attesting Officer

JAMES E. ROGAN
Director of the United States Patent and Trademark Office